April 24, 1934. M. BELLEC ET AL 1,956,056
AUTOMOBILE SIGNAL SWITCH
Filed April 6, 1932
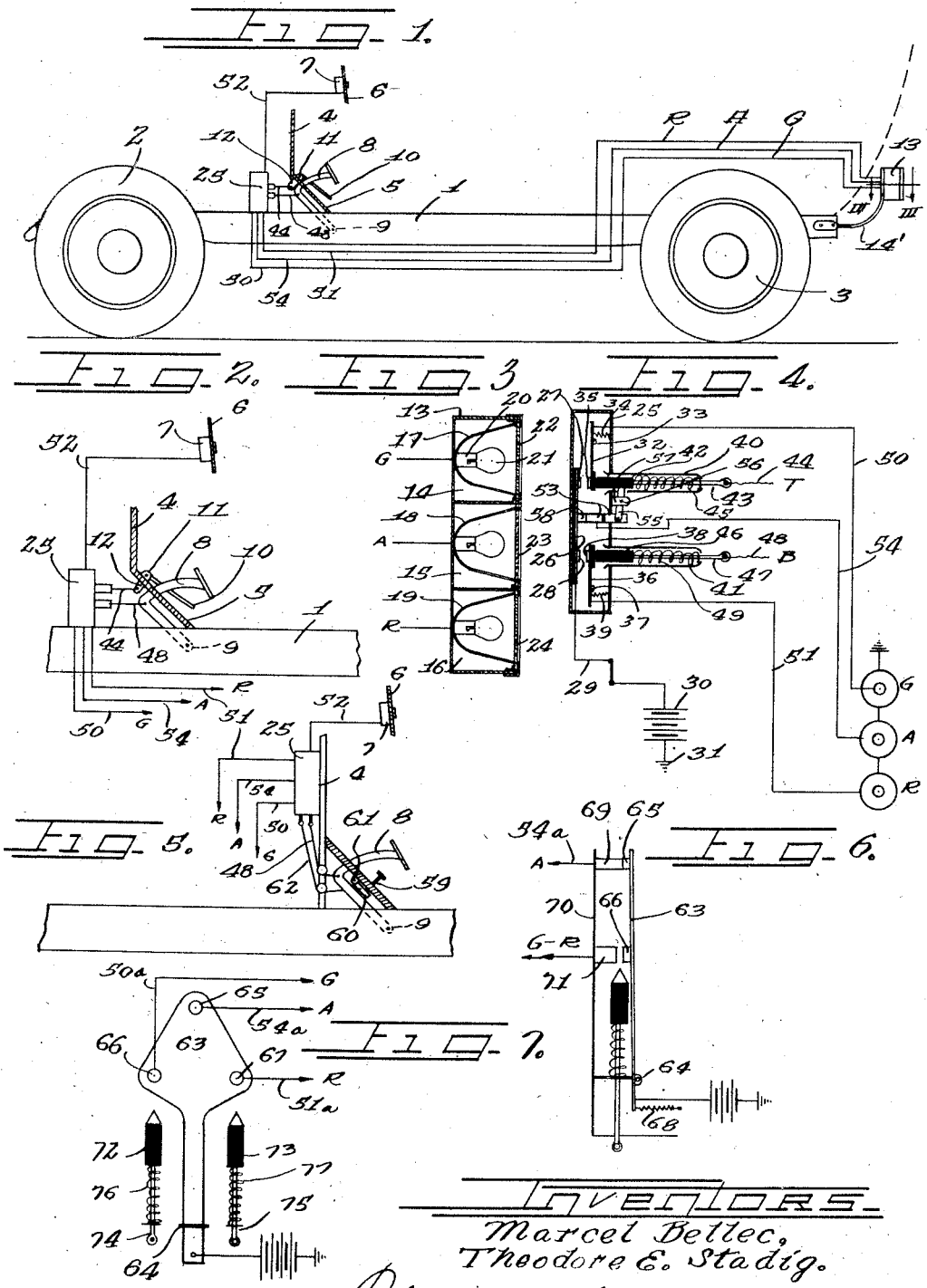

Patented Apr. 24, 1934

1,956,056

UNITED STATES PATENT OFFICE 1,956,056

AUTOMOBILE SIGNAL SWITCH

Marcel Bellec, Miami Beach, and Theodore E. Stadig, Miami, Fla.

Application April 6, 1932, Serial No. 603,488

2 Claims. (Cl. 200—4)

The present invention relates to an automobile signal and more particularly to a signaling device supplied at the rear of an automobile to indicate the intention of the driver as to the state of rest or motion of the vehicle.

The invention seeks to provide a simple and readily operable mechanism, of few parts, whereby the driver of a following vehicle may have some idea as to the progress of a preceding vehicle equipped with the apparatus of the present invention.

It is an object of the present invention to provide simple means for indicating to following vehicles the intention of the driver of a vehicle equipped with the apparatus of the present invention as to his progress, which apparatus at the same time may be simple, easily applied and positively operated.

Generally speaking, the invention contemplates a signal-device applied at the rear of an automobile with three lamps of different colors, one lamp being amber colored and marked with the word "Caution" or the word "Care" or the letter "C". Another lamp is preferably green and marked with the word "Go" or the letter "G". The third lamp is colored red and is marked "Stop" or the letter "S" to indicate stop. The caution lamp is in circuit with the ignition switch so as to be lighted as soon as the ignition switch is turned on while the Go and Stop switches are connected respectively to the throttle lever and the brake lever for illuminating either of these lamps when its respective lever is moved from normal position in the operation of the movement of the vehicle.

The invention further contemplates a connection between the go-circuit and the caution-circuit whereby the caution lamp is cut out when the go-lamp is put in circuit. As long as the ignition is on, some lamp will be illuminated, be the vehicle at rest or in motion.

The above, other and further objects of the invention will be apparent from the following description, accompanying drawing and appended claims.

The accompanying drawing illustrates, somewhat diagrammatically, apparatus for accomplishing the purposes of the present invention and the views thereof are as follows:

Figure 1 is a side elevational view of a schematic illustration of an automobile frame showing diagrammatically the installation of a device embodying principles of the present invention and showing connections for actuating the same.

Figure 2 is a schematic arrangement of certain of the operating parts of the vehicle showing the relation of the same to the ignition switch and to certain of the conductors of the present invention.

Figure 3 is a horizontal sectional view taken substantially in the plane of line III—III of Figure 1 showing a lamp casing suitable for practicing the present invention.

Figure 4 is a wiring diagram.

Figure 5 is a view similar to Figure 2 showing a different position of the switch box.

Figure 6 is a side elevational view of one form of switch suitable in connection with the present invention.

Figure 7 is a front elevational view of the switch of Figure 6.

The drawing will now be explained.

An automobile frame is designated generally at 1 provided with the usual front wheels 2 and rear wheels 3. A dash 4 with floor boards 5 appears in the usual position with respect to the frame 1. A cowl 6 is illustrated as supporting the ignition switch box 7 which is usually operated by a key carried by the operator of the vehicle.

A brake lever or pedal 8 of typical form is pivoted at 9 to the usual brake actuating rod and has movement to the left as viewed in the drawing for applying the brakes. The brake lever 8 in the drawing is shown as normal or inoperative or off position.

A throttle lever, such for instance as an accelerator pedal 10, is pivoted at 11 and as illustrated has an arm 12 connected with it, which arm extends through the floor boards 5.

A lamp casing 13 is supported at the rear of the vehicle by brackets 14' or in any other suitable manner. The illustrated form of casing is shown as provided with three horizontally disposed pockets 14, 15 and 16 within which are reflectors 17, 18 and 19. Within every one of the several pockets is a lamp socket 20 for receiving the usual lamp 21. The pockets are closed by suitable cover material such as glass or other transparent substances 22, 23, and 24. The cover 22 is green and is supplied with the word "Go" or the letter "G" as desired. The cover 23 is amber or some other distinguishing color and is provided with the word "Caution", "Care", or the letter "C". The cover 24 is red and is provided with the word "Stop" or the letter "S".

The casing 13 might be disposed vertically as well as horizontally or perhaps triangular in outline as desired.

As is usual practice in connection with automobile lighting schemes the various lamps are grounded to the frame structure in any suitable manner.

Every one of the lamps is provided with a separate electrical circuit for actuating the same when occasion arises.

A switch box 25 is disposed adjacent the dashboard and in Figures 1 and 2 is illustrated as supported on the frame structure 1 of the automobile. In Figure 5 the box is supported on the rear of the dash.

Figure 4 illustrates diagrammatically one form of switch for putting in the circuit the several lamps as various of the operating levers of the automobile may be actuated in service.

A conductor bar 26 is supported within the casing 25 and suitably insulated from the same. This bar is illustrated as provided with contact points 27 and 28. A conductor 29 leads from the conductor bar 26 to the battery 30, that is, to one terminal of the battery while the other terminal is grounded as at 31.

Within the case 25 a rocking blade 32 is arranged to rock about a pivot 33 within the case. A spring 34 acts against the blade 32 to maintain it normally away from the contact 27. The blade 32 is provided with a contact point 35 for engaging the contact point 27 on the conductor 26 when the switch is closed in a manner to be hereinafter described.

Another blade 36 is arranged to rock about a pivot 37 and carries a contact point 38 for engaging the contact point 28 on the conductor 26. A spring 39 acts to maintain the blade 36 away from the conductor 26.

Extending from one side of the case 25 are two housings 40 and 41. Within the housing 40 is a plunger 42 secured to the end of the rod 43 which rod is connected by a cable 44 to the throttle lever 10. A spring 45 within the housing 40 acts against the plunger 42 to urge it in a direction to move the blade 32 against the contact point 27 of the conductor 26. The plunger is restrained against action by the spring by the normal position of the throttle lever 10 which, as well understood, is maintained in normal position by a suitably disposed spring or equivalent means, not shown.

Within the housing 41 is a similar plunger 46 supported on a rod 47 which is connected by a cable 48 to the brake lever 8. A spring 49 within the housing 41 acts to urge the plunger in a direction to move the blade 36 against the contact point 28 on the conductor 26 and is sustained normally from such movement by the normal position of the brake lever 8.

A conductor 50 leads from the blade 32 to the lamp 21 in the pocket 17, that is, the "Go" signal. Another conductor 51 leads from the spring blade 36 to the lamp 21 in the pocket 16, that is, the "Stop" signal.

The ignition switch is represented generally at 7 and is usually disposed on the cowl 6 for accessibility. Electrical connection is established, within the case 25, between the ignition switch 7 through a conductor 52 to the conductor plate 26. The connections are such that when the ignition is on circuit is closed to the amber lamp 22 in the pocket 15, thus indicating that the ignition circuit is on even though the vehicle be at rest.

It is desirable to cut out the "Caution" signal when the vehicle is moving and to this end, interconnecting means are provided between the switch controlling the circuit through the "Go" signal and the circuit to the "Caution" signal.

Such means are illustrated diagrammatically in Figure 4 and comprise a block 53 one portion of which has connected to it a conductor 54 which leads to the lamp 21 in the "Caution" pocket 15. Another part of this block is insulated from the first block and is connected by a swinging link 55 to the plunger 42. The link 55 being pivoted at 56 to a bracket 57. It will thus be observed that when the plunger 42 is free to move under the influence of the spring 45 it will move the block 53 to the right as viewed in Figure 4 thus breaking contact thereof against the point 58 in the conductor plate 26, thus breaking the circuit to the "Caution" signal.

The provision of the cable connecting the plungers and the operating levers of the vehicle enables immediate movement of the plungers by the springs whenever the levers be moved from normal position in the operation of the vehicle. The distance of travel between the contact points on the bar 26 and the swinging blades 32 and 36 is slight so that by the slight movement of either the throttle lever 10 or the brake lever 8 allows closing of the circuit to the signals controlled by these levers.

It will thus be observed that as soon as the ignition is turned on the "Caution" light is illuminated, then when the vehicle is started the throttle lever 10 is pressed cutting out the "Caution" signal and cutting in the "Go" signal, to indicate to a following vehicle that the first vehicle is under way and will proceed. The moment pressure is relieved from the throttle lever 10 it is returned to normal position thus opening the "Go" circuit and closing the "Caution" circuit because of the interconnection between the switches controlling these circuits. Whenever the brake lever 8 is actuated to apply the brakes, the "Stop" or red signal is put in circuit thus indicating to a following vehicle that the driver is about to slacken speed or stop his movement entirely and thus serving adequate warning to such following vehicle.

Figure 5 illustrates the switch casing 25 as mounted on the dash 4 where it operates and functions in exactly the same manner as heretofore described. In Figure 5 a different form of throttle lever is illustrated as comprising a push button 59 acting against the lever 60 pivoted at 61, which lever is connected by the cable 62 to the rod 43 of the "Go" switch.

Figures 6 and 7 illustrate a slightly different form of switch.

The switch illustrated in these figures includes a plate 63 which rocks about a pivot 64 and which carries on its rear side a contact point 65 and laterally spaced contact points 66 and 67. The plate 63 is illustrated as somewhat spade-like in appearance and is made so as to separate the contacts 66 and 67 laterally. A spring 68 urges the plate 63 to the left as viewed in Figure 6, that is, in a direction to close the circuit to the "Caution" signal.

A contact point 69 is supported on a back plate 70 for engagement by the contact 65 on the plate 63. The plate 63 is movable with respect to the back plate 70.

The back plate 70 carries contact points 71 opposite the points 66 and 67 on the plate 63. A conductor 54ª leads from the contact point 69 to the amber light in the pocket 15. A conductor 50ª leads from one of the contact points 71 on the back plate 70 through the green lamp in the pocket 14 while a third conductor 51ª leads from the other contact point 71 on the back plate 70 to the "Stop" signal.

Plungers 72 and 73 are arranged to move vertically. The plunger 72 is supported on a rod 73 which is connected by cable not shown to the throttle lever 10 while the rod 75 carrying the plunger 73 is connected by a cable to the brake lever 8. A spring 76 about the rod 74 tends to urge the plunger 72 upwardly while a similar spring 77 on the rod 75 exercises this function with respect to the plunger 73. The ends of the plungers are pointed and consist of metal so that when urged upwardly under the influence of the springs the pointed ends will enter between either of the points 66 and 67 and its cooperating rear contact 71 to close the circuit between these contacts and to move the plate 63 away from the back plate thus breaking circuit to the "Caution" signal, that is, separating the contacts 65 and 69.

The invention has been described herein more or less precisely as to details, yet it is to be understood that the invention is not limited thereby, as changes may be made in the arrangement and proportion of parts, and that equivalents may be substituted without departing from the spirit and scope of the invention.

The invention is claimed as follows:

1. An electric switch for controlling a plurality of branch circuits, said switch comprising a plate carrying a plurality of contact points in relatively spaced relation, a second plate carrying a like plurality of spaced points for mating with the points on said first plate for providing a plurality of pairs of contacts, the contacts on one of said plates being connected to the hot side of a main circuit, the contacts on the other of said plates being severally connected to one side of a plurality of branch circuits, the plates and contacts being so arranged that normally but one pair of contacts is in circuit closing engagement and the other pairs are a part or in open position, means for establishing electrical connection between said open pairs of contacts comprising individually movable members arranged with a member for every pair of open contacts, means for normally maintaining said members out of circuit closing relation with said open pairs of contacts, and means for selectively moving a member into circuit closing relation with its pair of open contacts, the arrangement being such that when any of said members is moved into circuit closing relation with its contact points the normally closed contacts are separated to open the circuit thereby controlled.

2. An electric switch for controlling a plurality of branch circuits, including in combination, a plurality of spaced contact points suitably supported on a fixed support, a movable contact member normally in circuit closing engagement with one of said contact points, a connection from the hot side of a circuit to said one contact point, and individually movable members arranged to selectively connect any of said other contact points with said hot side, the arrangement being such that when any of said members is moved into circuit closing relation with its contact points the normally closed contacts are separated to open the circuit thereby controlled.

MARCEL BELLEC.
THEODORE E. STADIG.